Figure 1:
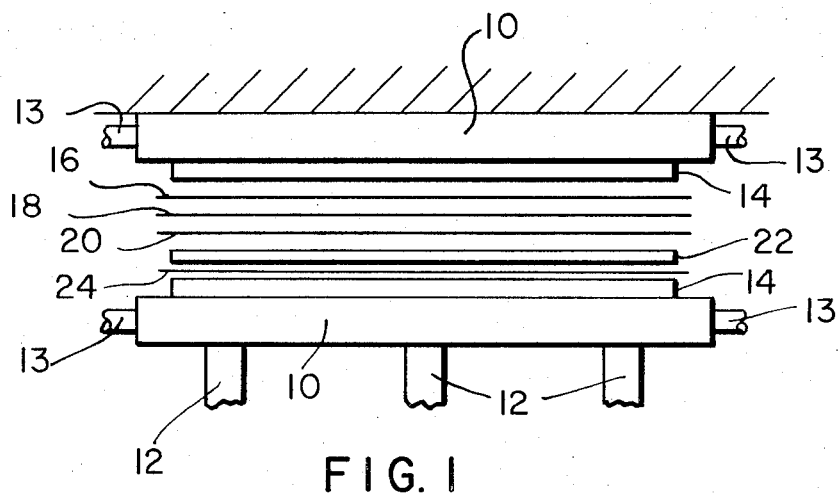

United States Patent [19]
Haigh

[11] 3,860,388
[45] Jan. 14, 1975

[54] DISPERSE DYE TRANSFER THROUGH POLYOLEFIN RELEASE LAYER TO NON-POROUS THERMOPLASTIC SHEET DYED THEREBY

[76] Inventor: John M. Haigh, 36 Lowell St., Peabody, Mass. 01960

[22] Filed: Sept. 25, 1972

[21] Appl. No.: 291,657

[52] U.S. Cl. ................. 8/2.5, 250/318, 264/129, 264/130, 264/340, 101/464, 101/467, 101/470, 156/277, 156/289, 8/4, 161/406, 161/249, 161/208, 161/216
[51] Int. Cl. .............................................. D06p 1/76
[58] Field of Search ....................... 8/2.5; 101/470

[56] References Cited
UNITED STATES PATENTS

| | | | |
|---|---|---|---|
| 2,657,970 | 11/1953 | Rudech | 8/4 |
| 2,842,525 | 7/1958 | Gateff | 8/4 |
| 2,857,283 | 10/1958 | Ferth | 8/4 |
| 3,206,601 | 9/1965 | Gold | 250/318 |
| 3,262,386 | 7/1966 | Gordon | 101/470 |
| 3,311,489 | 3/1967 | Barbor | 117/36.1 |
| 3,357,353 | 12/1967 | Teuscher | 101/470 |
| 3,532,532 | 10/1970 | Berman | 117/36.1 |

FOREIGN PATENTS OR APPLICATIONS

| | | | |
|---|---|---|---|
| 647,105 | 12/1950 | Great Britain | 8/2.5 |

OTHER PUBLICATIONS

Datye, Textilveredlung, Transport Phenomena in Dyeing Polyester substrates with Disperse Dyes at Elevated Temperature, 1965, No. 7, pages 562–563.
American Dyestuff Reporter, Jan. 4, 1965, page, 26–38.

*Primary Examiner*—Donald Levy
*Attorney, Agent, or Firm*—Thomas C. Stover, Jr.

[57] ABSTRACT

Method of dye absorption into the surface of plastics is accomplished by placing polyethylene film between a dye transfer paper and a sheet of plastic and applying pressure and heat thereto. The heat applied is sufficient to soften the film and to sublime the dyes through the film to the plastic material. The dyes are absorbed into the surface of the plastic with the design intact. The materials are then cooled and separated and a decorated plastic with wear-proof design is obtained.

12 Claims, 2 Drawing Figures

PATENTED JAN 14 1975 3,860,388

3,860,388

DISPERSE DYE TRANSFER THROUGH POLYOLEFIN RELEASE LAYER TO NON-POROUS THERMOPLASTIC SHEET DYED THEREBY

FIELD OF THE INVENTION

This invention relates to applying designs to materials particularly dyes to plastic materials.

THE PRIOR ART

With the widespread use of plastic articles in business and in the home, the need for suitably decorating these articles is obvious, e.g. articles such as table and counter tops, wall panelling, furniture and the like. However, plastic surfaces have uniformly resisted printing and design applications and paper-printed designs laminated to plastic sheets have resulted as a substitute. This industry is referred to as high pressure decorative molding. As an alternative solution to the above difficulties, design, colors, patterns, printing and the like have been applied to plastic sheets, particularly film, of necessity, by specially treating the plastic film surface, e.g. corona discharge treatment, printing on the film surface and adhering the film to the plastic sheet. This procedure requires numerous steps and difficulties are encountered such as rub-off of the printed matter from the film and difficulty in obtaining lay-flat and good adhesion of the film to the substrate. To avoid printed matter rub-off, the film has been frequently printed on the reverse side and the printed side adhered to the substrate, the printed matter being viewed through the film. This procedure, however, requires a transparent film and raises problems including adhesion difficulties of the printed side of the film to the substrate.

Fabric decorating, on the other hand, has evolved to a well-developed technology and patterns, colors and designs are readily imprinted thereon as follows. Design dyes are printed on so-called heat transfer papers, which papers are then placed against the desired fabric and heat and limited pressure (1 to 5 psi) applied and the dyes sublime into vapor form and transfer from the paper to fabric, the design intact.

Although it has long been desired to apply the fabric design process to plastic materials, the translation has proved unworkable, since the heat required to sublime the dyes also is sufficient to soften the plastic receptor surface, as well as the dye adhesives on the transfer paper, and paper and plastic fuse together. This impediment has made the application of the fabric printing method to plastic materials practically impossible. There is, therefore, a need and market for a process for imprinting plastic materials in a durable, efficient manner, so as to obviate the above difficulties.

SUMMARY

There has now been discovered a method for transferring dye patterns, colors and design to plastic materials in a permanent and durable manner, wherein sticking of transfer paper and plastic is avoided. The invention not only provides a method of printing plastic materials as readily as paper or fabrics, in addition, the patterns, colors and designs are transferred in such a manner as to penetrate the plastic material below the surface thereof, rendering the so-transferred designs wear and rub proof. Moreover, the dyes are transferred to the plastic receptor material free from dye adhesives and other vehicles and in greater concentration than possible with fabrics, producing plastics with designs of surprising clarity, definition and intensity.

Broadly the present invention provides a method for transferring patterns to dye receptor material comprising interposing a dye carrier material between a dye transfer sheet and the dye receptor material, pressing the materials together to obtain close contact therebetween, heating the pressed materials to a sublimation temperature for the dyes and to a softening point of the dye carrier sheet, maintaining the materials at said temperature until a substantial portion of the dyes have sublimed and transferred through the dye carrier material to the dye receptor, cooling the materials below the softening temperature of the dye carrier and dye receptor, and separating the dye receptor from the pressed materials.

The invention further provides printed plastic comprising plastic material penetrated with dye therein and laminates thereof.

DESCRIPTION

Figure 2:
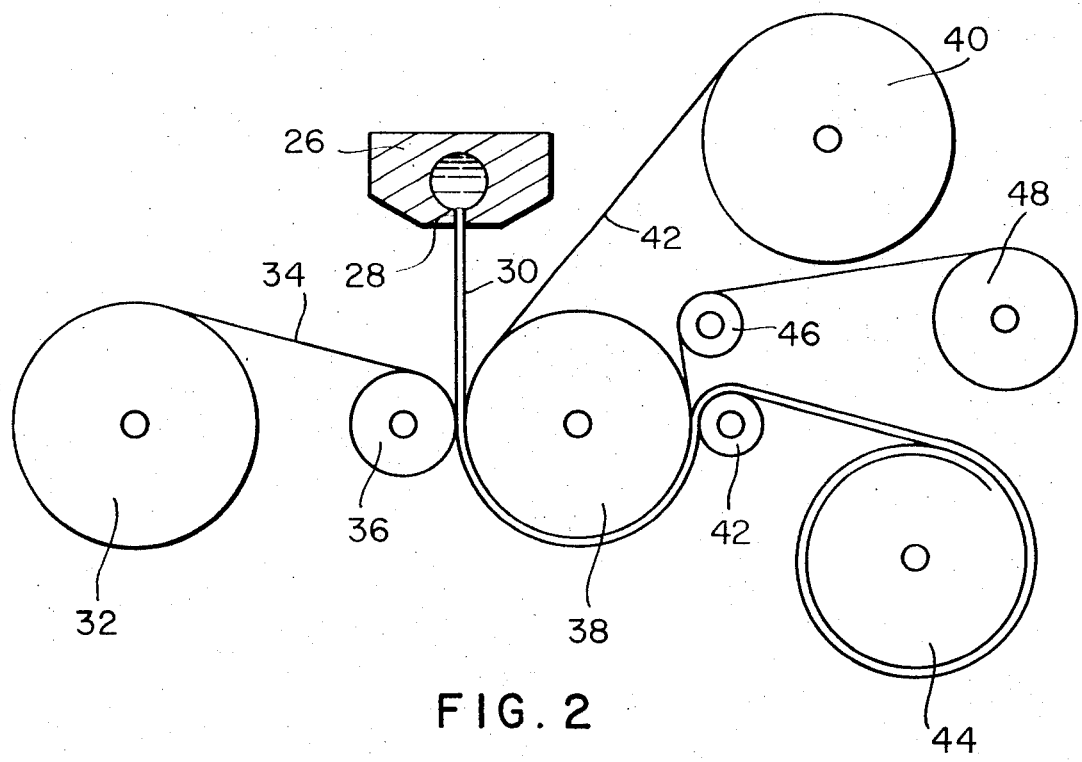

The invention will become more apparent from the following detailed specification and drawings in which:

FIG. 1 is a partial sectional elevation view of the dye transfer apparatus embodying the present invention and FIG. 2 is a schematic diagram of a dye transfer process embodying the present invention.

Referring now to the drawings, platen 10, heated and cooled by water ducts 13, have positioned therebetween smooth surfaced press platens 14, heat transfer printing paper 16, inert dye carrier sheet 18, dye receptor sheet 20, laminate base material 22, and a release sheet 24 as shown in FIG. 1. Hydraulic rams 12 press the platens and above sheets together to a desired pressure. Hot liquid is admitted to platens 10 by ducts 14 to apply heat to the composite stack of pressed sheets, sufficient to induce sublimation of the dyes on the heat transfer printing paper 16 through the carrier sheet 18 and on and into the receptor sheet 20 and at the same time to cause bonding of the receptor sheet 20 and the laminate base material 22. Subsequently, cooling water is fed into platens 10 by ducts 13 to cool the composite stack of sheets, after which the platens are opened and the sheets removed, i.e., the paper 16 and carrier sheet 18, e.g. polyethylene, adhere together and are removed as one. The carrier sheet 20 is readily removed from the receptor sheet 20. The dye receptor sheet 20 adheres to the laminate base sheet 22, forming the printed plastic product embodying the invention, and is removed from the platen as one. The release sheet 24 is readily removed from the back of the laminate base sheet.

In another embodiment, a dye pattern can be transferred to an issuing extrudate. For example, extruded plastic sheet 30, issuing from die 26, via die orifice 28, is contacted with laminate base material web 34 on one side thereof and with polyethylene coated heat transfer paper 42 on the other side thereof, in the nip of pressure roll 36 and cooling roll 38, as shown in FIG. 2. Web 34 is fed from supply roll 32 to pressure roll 36 and heat transfer paper 40 is fed from supply roll 40 to roll 42 where said web 34 and paper 40 are contacted with the still-hot extruded sheet 30 under the pressure of said nip and all three sheets are bonded together at a temperature sufficiently high to sublime the dyes from the paper 40 to the receptor extrudate 30, thence said bonded sheets are passed around cooling roll 38 wherein the respective sheets are cooled below their softening temperatures as shown in FIG. 2. The cooled sheets are then separated by passing the laminate of sheet 30 and web 34 around striping roll 42 to wind up roll 44 while the polyethylene coated paper 42 is readily separated and passed around guide roll 45 to collection roll 48.

Thus the present invention provides a method for ready and accurate transfer of dyes, prints, patterns, colors and the like from dye carrier paper to the dye receptor surface in a novel low cost process to achieve a dyed plastic material of high clarity reproduction. The transferred dyes are especially vivid because the dye carrier medium, e.g. polyethylene, screens out impurities, e.g. dye adhesives, transfer agents and the like. The so-transferred dyes due to the heat and pressure applied penetrate below the surface of the dye receptor and will not rub or wear off.

As discussed above, the invention employs a heat transfer paper, a dye carrier medium and a dye receptor at a desired temperature and pressure range to achieve the uniquely colored plastics of the present invention.

The heat transfer paper can be any of the numerous dye imprinted papers now available, including those numerous papers in use in transferring dyes and dye patterns in the fabric and textile industry.

The dyes can be of various dyes capable of sublimation at 200° F and up, including those dyes in use on heat transfer papers for dye transfer in the textile industry.

The inert die carrier medium serves to separate the heat transfer paper from the dye receptor surface, yet it does not adhere in any way to the dye receptor surface following the heat transfer. The inert dye carrier medium includes materials which have the following properties:

1. Capable of allowing the passage of dye from the transfer paper to the dye receptor surface, at the dye sublimation temperature, without distorting the dye and consequently the design.

2. Does not significantly absorb the dye in its passage to the dye receptor surface, at the dye sublimation temperature.

3. Does not adhere to the dye receptor surface under conditions most suitable for dye transfer and/or dye transfer and product lamination. More specifically, the inert dye carrier medium should not stick to the dye receptor surface at the temperature and pressures that the dye sublimes to the dye receptor. Moreover, where it is desired to accomplish dye transfer and lamination into product in a single operation, the inert dye carrier medium should not stick to the dye receptor surface under the conditions of a laminating press cycle or an extruder lamination process or other lamination process.

The dye carrier medium herein is preferably sheets, including films, of polyolefins and most preferably polyethylene film. In addition to meeting the above criteria for a suitable inert dye carrier medium, polyethylene is readily available at low cost.

The dye carrier medium can be employed in the process of the invention is a free sheet or film that is mechanically placed between the transfer print paper and the dye receptor surface, or as a secured coating on the printed face of the heat transfer paper. A secured coating of, for example, polyethylene to the transfer paper can be readily achieved at the end of a printing line by a solvent or emulsion base polyethylene coating step or by an extrusion coating step.

It will be readily understood, by those in the art, why polyolefins and particularly polyethylene does not adhere to plastic materials of the type used in decorative product or laminate product herein. Basically, polyethylene is a good releasing material of a different chemical nature than the normal components of a decorative product, as defined below. However, the fact that polyethylene allows the transmission of sublimed dyes without significant absorption or distortion of the dye is a wholly novel and unexpected development.

In the process of this invention, the dye receptor can be any material, particularly thermoplastics, which will absorb sublimed dyes and will not adhere to the inert dye carrier medium when the materials are separated. The dye receptor materials suitable for the present invention include: polycarbonates, vinyls, acrylics, polystyrene, A.B.S. (Acrylonitrile Butadiene Styrene) and like extrudable polymers.

The temperatures necessary to effect dye transfer and absorption in the present invention has been found to be governed by the temperatures required for dye sublimation and the temperatures at which the dye carrier medium softens and dye receptor surface energy level rises to become susceptible to dye penetration which can be at or below the softening temperatures therefor. These temperatures have been found to be 230° to 450° F and up, depending upon the materials employed. After the dye transfer is completed, the materials are cooled below the plastic softening temperatures and the applied pressure released and the materials separated, i.e. transfer paper and carrier medium, which usually adhere, are readily separated from the dye receptor material.

If it is desired to laminate the reverse side of the dye receptor to another material, as discussed above, the lamination can be carried out concurrently with the dye transfer step in the above temperature range of 230° to 450° F, depending upon the substrate employed. After die transfer and lamination occur, the materials are cooled and separated as discussed above.

In the applied pressures necessary to effect dye transfer and absorption, 1, to 5 psi has been found sufficient. Lamination pressures, however, run considerably higher, from 50 to 2,000 psi. There, lamination pressure would be too great in the conventional dye transfer to cloth process and would result in the heat transfer paper adhering to the dye receptor cloth. However, in the present invention, utilizing the above described dye carrier medium, such adhesion is prevented and pressures of from 1 to 2,000 psi can be employed to obtain either high clarity dye transfer or dye transfer and concurrently, lamination of the dye receptor to a substrate. A preferred pressure range for dye transfer or dye transfer and lamination is 50 to 2,000 psi.

The laminate base materials referred to herein include treated papers, fabrics, plastic materials, including thermoplastic film and sheets and any other material bondable to the thermoplastic dye receptor.

The following table serves to exemplify the method and products of the present invention as to materials, pressures and temperatures employed.

TABLE I

| Dye Receptor Surface | Laminate Base Material | Laminating Pressure | Lamin. Temp. |
| --- | --- | --- | --- |
| 2 mil Vinyl Film (clear) | Acrylic Resin Impregnated Kraft | 150 psi | 300°F |
| 3 mil Acrylic Film (clear) | Acrylic Resin Impregnated Kraft | 150 psi | 300°F |
| 3 mil Acrylic Film (clear) | Phenol-Formaldehyde Treated Kraft | 1000 psi | 300°F |
| 3 mil Acrylic Film (clear) | Vulcanized Fiberboard | 150 psi | 300°F |
| 3 mil Acrylic Film (white) | Low Density Hardboard | 50 psi | 300°F |
| 3 mil Acrylic Film (white) | High Density Hardboard | 150 psi | 300°F |
| 2 mil Vinyl Film (clear) | A.B.S. Plastic | 20 psi | 270°F |
| 20 mil Polycarbonate (clear) | Polycarbonate (white) | 200 psi | 360°F |
| 2 mil Acrylic Film (clear) | C.A.B. Plastic (Cellulose Acetate Butyrate) | 30 psi | 260°F |
| 3 mil Styrene (clear) | Styrene (opaque) | 30 psi | 280°F |
| 3 mil Polyester (clear) | Treated High Density Hardboard | 150 psi | 300°F |
| 3 mil Polyester (clear) | Polyester Treated Kraft | 200 psi | 300°F |
| 2 mil PVF (clear) | Polyester Treated Kraft | 150 psi | 250°F |

In all the above examples the dye carrier medium employed was unpigmented 2 mil polyethylene film.

What is claimed is:

1. A method for transferring patterns to dye receptor thermoplastic non-porous sheet, comprising interposing a polyolefin sheet between a dye transfer sheet containing dispersed dyes and said dye receptor thermoplastic sheet; pressing said sheet together to obtain close contact therebetween; heating the pressed sheets to a sublimation temperature for the dyes and to a softening point of said polyolefin sheet; maintaining said sheets at said temperature until a substantial portion of said dyes have sublimed and transferred through said polyolefin sheet to said dye receptor sheet; cooling said sheets below the softening temperature of the polyolefin sheet and dye receptor sheet and separating said dye receptor sheet from the pressed materials.

2. The method of claim 1, wherein said sheets pressed between heated platens.

3. The method of claim 1 wherein said polyolefin is first coated upon said dye transfer sheet.

4. The method of claim 1 wherein said dye transfer sheet and said polyolefin sheet are pressed together with a thermoplastic sheet extrudate after the latter issues from a die and the sheets are pressed in the nip of rollers.

5. The method of claim 1 wherein said sheets are pressed between 1 to 2,000 psi.

6. The method of claim 1 wherein said sheets are heated over 230° F.

7. The method of claim 1 wherein polyethylene is employed as said polyolefin sheet.

8. A method for dye transfer and lamination of sheets comprising, interposing a polyolefin sheet between a dye transfer sheet containing dispersed dyes and a dye receptor thermoplastic non-porous sheet placing a laminating sheet adjacent said dye receptor sheet, on the reverse side thereof; pressing all of said sheets together to obtain a close contact therebetween at a laminate pressure for said dye receptor sheet and said laminate sheet; heating the pressed sheets to a sufficient temperature for sublimation of the dyes and for fusion of the dye receptor sheet and said laminating sheet; maintaining said heat and pressure until a substantial portion of said dyes have transferred to said dye receptor sheet and said lamination has occurred; cooling the pressed materials to complete said lamination; releasing said pressure and separating the resulting laminate of dye receptor sheet and laminated sheet from the dye transfer sheet and the polyolefin sheet.

9. The method of claim 8 wherein said polyolefin is first coated upon said dye transfer sheet.

10. The method of claim 8 wherein said dye receptor sheet issues as an extrudate between said laminating sheet and said polyolefin sheet and said dye transfer sheet and all materials are pressed together in the nip of rollers.

11. The method of claim 8, wherein said sheet are pressed between 1 to 2,000 psi.

12. The method of claim 8 wherein said sheet are heated over 230° F.

* * * * *